(12) United States Patent
Lechnick et al.

(10) Patent No.: US 7,967,896 B2
(45) Date of Patent: Jun. 28, 2011

(54) USE OF HYDRAULIC TURBOCHARGER FOR RECOVERING ENERGY FROM HIGH PRESSURE SOLVENTS IN GASIFICATION AND NATURAL GAS APPLICATIONS

(75) Inventors: William J. Lechnick, Glen Ellyn, IL (US); Nagaraju Palla, Woodridge, IL (US); Paul A. Sechrist, South Barrington, IL (US); Lamar A. Davis, West Dundee, IL (US); Michael R. Van de Cotte, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 578 days.

(21) Appl. No.: 12/055,921

(22) Filed: Mar. 26, 2008

(65) Prior Publication Data

US 2009/0241773 A1    Oct. 1, 2009

(51) Int. Cl.
*B01D 53/14*    (2006.01)
(52) U.S. Cl. ............... 95/172; 95/177; 95/192; 95/199; 95/208; 95/235; 95/236
(58) Field of Classification Search ............ 95/235–236, 95/172, 177, 192, 208, 199
See application file for complete search history.

(56) References Cited

U.S. PATENT DOCUMENTS

| | | | |
|---|---|---|---|
| 3,664,091 A * | 5/1972 | Hegwer | 95/161 |
| 4,044,100 A | 8/1977 | McElroy, Jr. | 423/226 |
| 4,336,233 A * | 6/1982 | Appl et al. | 423/228 |
| 5,736,116 A | 4/1998 | LeBlanc et al. | 423/359 |
| 6,139,740 A * | 10/2000 | Oklejas | 210/321.66 |
| 6,345,961 B1 | 2/2002 | Oklejas, Jr. | 417/365 |
| 6,713,028 B1 | 3/2004 | Oklejas, Jr. | 422/209 |
| 6,883,327 B2 | 4/2005 | Iijima et al. | 60/649 |
| 2005/0172807 A1* | 8/2005 | Mak | 95/235 |
| 2005/0255012 A1 | 11/2005 | Mak | 422/187 |
| 2006/0110300 A1 | 5/2006 | Mak | 422/190 |
| 2006/0162559 A1* | 7/2006 | Asprion et al. | 95/235 |

* cited by examiner

*Primary Examiner* — Duane Smith
*Assistant Examiner* — Ives Wu
(74) *Attorney, Agent, or Firm* — Mark Goldberg

(57) ABSTRACT

The invention provides a process and system for regenerating a solvent used to remove carbon dioxide from feed gases, such as natural gas and synthesis gas. The invention employs one or more hydraulic turbochargers to transfer energy from a higher energy solvent stream to a lower energy solvent stream. This provides for a significant reduction in operating expenses.

3 Claims, 5 Drawing Sheets

USE OF HYDRAULIC TURBOCHARGER FOR RECOVERING ENERGY FROM HIGH PRESSURE SOLVENTS IN GASIFICATION AND NATURAL GAS APPLICATIONS

BACKGROUND OF THE INVENTION

This invention is related to the removal of acid gases from a feed gas. More particularly the invention relates to acid gas removal from high carbon dioxide and hydrogen sulfide containing feed gases. A process is provided for reduced energy requirements in the regeneration of the solvent used to remove the acid gases.

Absorption systems are commonly used for the removal of $CO_2$ from natural gas or synthesis gas. A physical solvent such as a dimethylether of polyethylene glycol (DMPEG) can be used to wash out carbon dioxide and other acid gases such as hydrogen sulfide and carbonyl sulfide. DMPEG solvents are used in systems licensed by UOP LLC under the trademark Selexol™. Cryogenic methanol systems are also known to those skilled in the art for this use including the Rectisol™ process currently licensed by Lurgi AG. Other physical solvents that may be used include a mixture of N-formyl and N-acetyl morpholine, N-methyl-2-pyrrolidone and sulfolane.

After absorption of carbon dioxide and/or hydrogen sulfide and/or carbonyl sulfide by a physical solvent, the solution is regenerated to remove absorbed gases. The regenerated physical solvent can then be recycled for further absorption. Absorption and regeneration are usually carried out in different columns or drums containing packing or bubble cap tray for efficient operation. Regeneration is generally achieved in two stages. First, the absorbent solution's pressure is reduced so that absorbed carbon dioxide is vaporized from the solution in one or more flash vessels, sometimes terminating with a vacuum flash drum. Next, if thermal regeneration is required, the flashed absorbent is stripped with steam in a stripping regenerating column to remove residual absorbed carbon dioxide. Low carbon dioxide levels are needed in order to achieve the required carbon dioxide specifications for treated gas.

The prior art processes have significant power requirements. The solvent processes employ pressures that range from about 2758 to 7584 kPa (400 to 1100 psia) and solvent flow rates that range from 3000 to 20000 gpm. Some of the energy is recoverable from the solvent during pressure let down via turbines. However, conventional turbines have been found to be unreliable and cost prohibitive. The release of relatively large amounts of vapor combined with the high solvent flow rates often means that two or more conventional turbines are required to adequately recover the pump energy. However, the capital costs associated with multiple turbines usually makes this option economically unattractive.

It has now been found that a hydraulic turbocharger can be used to recover energy at a relatively low cost compared to turbines

SUMMARY OF THE INVENTION

The present invention involves the use of a solvent stream as the motive fluid at the elevated pressures typical of the process eliminating the high costs previously encountered in regenerating the solvent stream. The motive fluid that is used can be the bottom stream from a carbon dioxide absorber unit or the liquid from the recycle flash drum depending upon the configuration of the system. The pressure of the recycle flash drum can be varied as needed and in certain circumstances the drum can be removed if there is a need for additional energy. The operating pressure of the carbon dioxide absorber ranges from about 2758 to 6550 kPa (400 to 950 psia) so that sufficient energy would be available to be transferred from the fluid exiting the absorber to increase the pressure of another solvent stream. This invention is applicable to any process in which flash or thermal regeneration of a solvent is used in conjunction with a high pressure absorber.

The present invention comprises a process for treating a carbon dioxide containing gas comprised of sending a feed gas containing carbon dioxide through a carbon dioxide absorber unit and contacting it with a lean solvent to produce a loaded solvent containing a majority of said carbon dioxide from said feed gas and a treated gas, regenerating the loaded solvent in a carbon dioxide removal system, and recovering energy from at least one solvent stream to boost pressure of at least one other solvent stream through use of one or more hydraulic turbochargers. There are a number of different configurations that utilize the hydraulic turbocharger that are within the scope of the invention. The hydraulic turbocharger may be used to recover energy from a semi-lean solvent stream that exits the carbon dioxide absorber unit and transfers the energy to pump a lean solvent stream. Alternatively, a hydraulic turbocharger may be used to recover energy from a semi-lean solvent stream that exits the carbon dioxide absorber unit and transfers this energy to pump a semi-lean solvent stream from the carbon dioxide removal system. Also, there may be another hydraulic turbocharger to recover energy from a hydrogen sulfide absorber unit with transfer of this energy to pump a lean solvent stream. Another hydraulic turbocharger can be used instead to recover energy from a hydrogen sulfide concentrator solvent stream to use in pumping a lean solvent stream. The invention also involves a system for removal of carbon dioxide from a carbon dioxide containing solvent comprising a carbon dioxide absorber, a recycle drums a vacuum flash drum, an eductor and a carbon dioxide venting apparatus. The invention also comprises a system that is designed to run the processes described above.

The invention is generally applicable to physical solvents for which flash or thermal regeneration is used on the solvent stream to produce a solvent stream that contains almost no acid gas. Among the physical solvents that can be used are a dimethylether of polyethylene glycol (DMPEG), methanol, a mixture of N-formyl and N-acetyl morpholine, N-methyl-2-pyrrolidone and sulfolane. Dimethylether of polyethylene glycol is a preferred solvent for use in the present invention.

DETAILED DESCRIPTION OF THE INVENTION

The present invention includes at least one hydraulic turbocharger to recover energy from a solvent stream and transfer the energy to another solvent stream in a solvent process to remove impurities from gasification synthetic gas or natural gas. The main impurities that are being removed are hydrogen sulfide, carbon dioxide and carbonyl sulfide. The low cost of the hydraulic turbocharger results from the turbine side and pump side being coupled within a single component. There is no need for external equipment to transfer energy from the turbine to the pump, and there is no need for external shaft seals to prevent the process from leaking to the atmosphere. A single stage turbine is beneficial on the turbine side of the turbocharger because single stage turbines are more capable of handling large vaporization rates that are typically found in gas processes than the multiple stage turbines that are often required for conventional power recovery.

In the present invention, a hydraulic turbocharger is used to boost the pressure as necessary in the process solvent streams. In some processes there are often both lean and semi-lean solvent streams whose pressure must be increased from near ambient to over 7500 kPa or to the operating pressure of the absorber. The carbon dioxide absorber bottoms stream which is the highest pressure stream in the carbon dioxide absorption section can be used to boost the pressure of either the lean or semi-lean streams. In one embodiment of the invention, as the pressure of the carbon dioxide absorber bottoms stream is let down in the hydraulic turbocharger, the energy from this stream is used to boost the lean solution pressure. In another embodiment of the invention, the energy from letting down the pressure of the carbon dioxide absorber bottoms stream can be used to boost the pressure of the semi-lean solution. Additional embodiments of the invention employ hydraulic turbochargers at different locations within the process where it is advantageous to recover energy from one solvent stream and use it to increase the pressure of another solvent stream.

Figure 1:
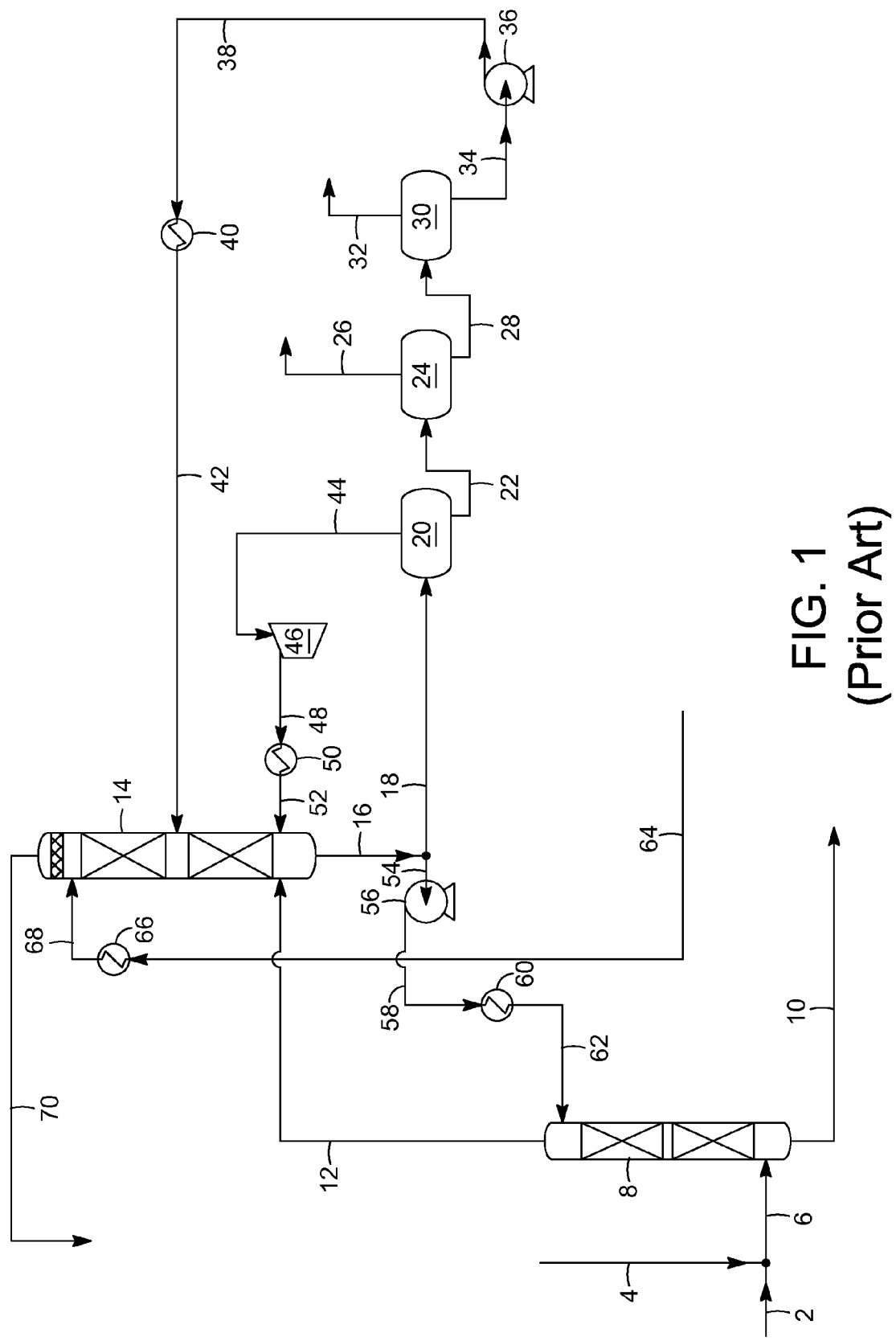
FIG. 1 shows a prior art process that does not use any turbines for power recovery.

A prior art system is shown in FIG. 1 in which a feed gas 2 and a recycle gas 4 from a hydrogen sulfide concentrator are combined in line 6 to enter a hydrogen sulfide absorber 8. Also entering hydrogen sulfide absorber 8 is a loaded solvent 62. A rich solvent stream 10 leaves the bottom of the hydrogen sulfide absorber 8 and a gas stream containing carbon dioxide leaves the top of the hydrogen sulfide absorber in line 12. The gas stream in line 12 enters carbon dioxide absorber 14 where it is contacted with a semi-lean solvent that enters through line 42 and a lean solvent stream 64 that is chilled by chiller 66 and enters carbon dioxide absorber 14 through line 68. The gas stream is treated in the carbon dioxide absorber and the treated gas exits in line 70. The loaded solvent containing carbon dioxide exits the carbon dioxide absorber in line 16. A portion of this loaded solvent is sent through line 54 to loaded solvent pump 56 to line 58, loaded solvent chiller 60 and line 62 back to the previously described hydrogen sulfide absorber 8. The other portion of the loaded solvent passes in line 18 to recycle flash drum 20 where some of the carbon dioxide passes through line 44 to recycle compressor 46 through line 48 to recycle cooler 50 to line 52 and then enters the carbon dioxide absorber. The solvent stream exits the recycle flash drum through line 22 and passes to carbon dioxide vent drum 24 from which more of the carbon dioxide is vented through line 26. The solvent stream then passes through line 28 to carbon dioxide vacuum drum 30 from which most of the remaining carbon dioxide is vented as shown in line 32. The resulting solvent is now semi-lean and passes through line 34 to semi-lean solvent pump 36, then to line 38, semi-lean solvent chiller 40 and then to line 42 to enter the carbon dioxide absorber.

Figure 2:
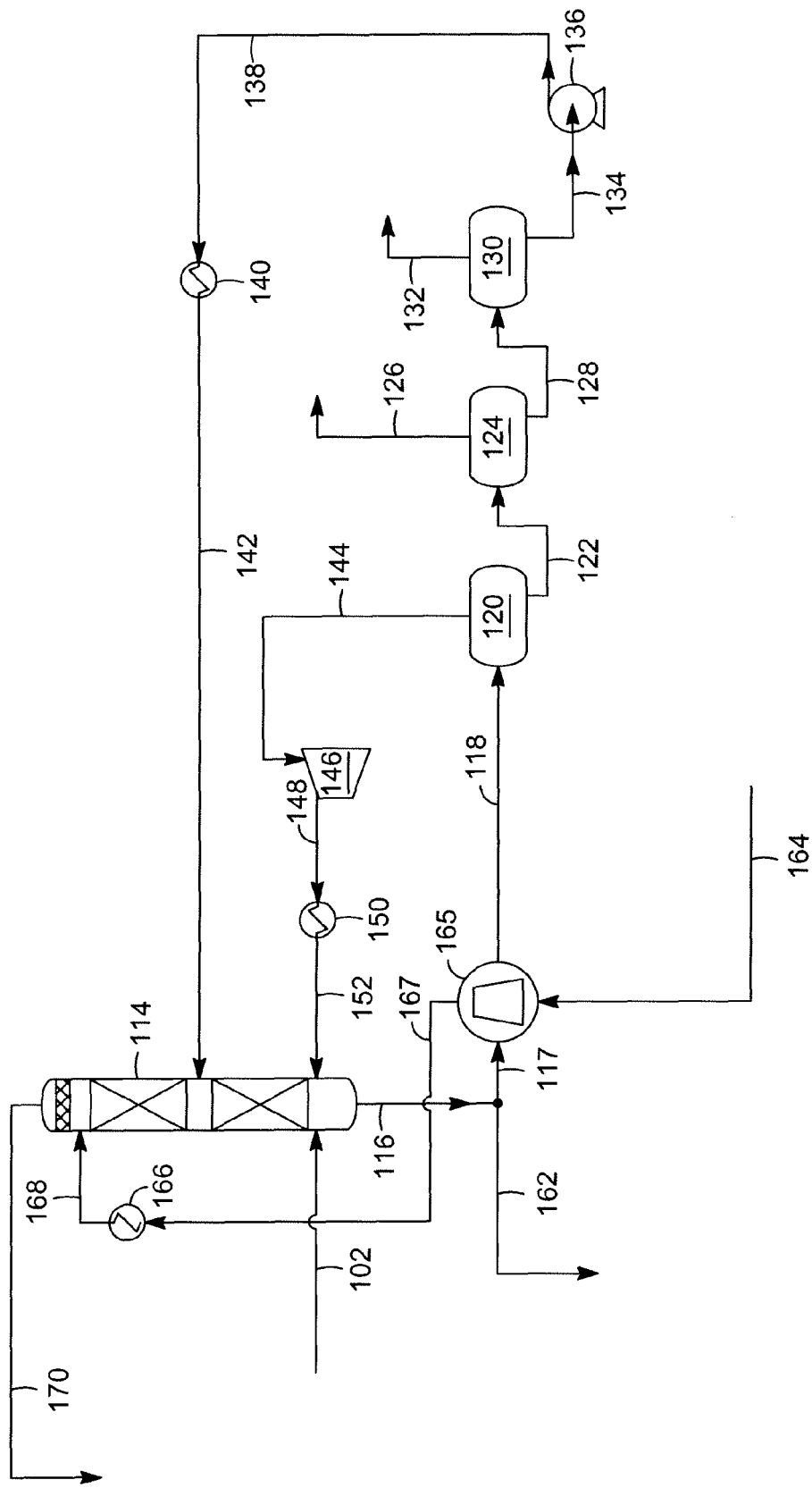
FIG. 2 shows a flow scheme in which a hydraulic turbocharger is used to recover energy from a semi-lean solvent stream to use in pumping a lean solvent stream.

In FIG. 2, a gas treating process is shown that uses a hydraulic turbocharger to recover energy from a semi-lean solvent stream for use in pumping lean solvent. A feed gas 102 enters a carbon dioxide absorber 114 where it is contacted with a semi-lean solvent that enters through line 142 and a lean solvent stream 167 that is chilled by chiller 166 and enters carbon dioxide absorber 114 through line 168. The gas stream is treated in the carbon dioxide absorber and the treated gas exits in line 170. The loaded solvent containing carbon dioxide exits the carbon dioxide absorber in line 116. A portion of this loaded solvent is sent through line 162 to another absorber or to be regenerated. The other portion of the loaded solvent passes in line 117 to hydraulic turbocharger 165. Also entering the hydraulic turbocharger is a lean solvent stream in line 164. The lean solvent stream exits in line 167 and a carbon dioxide-containing solvent stream exits the hydraulic turbocharger in line 118 and then enters recycle flash drum 120 where some of the carbon dioxide passes through line 144 to recycle compressor 146 through line 148 to recycle cooler 150 to line 152 and then enters the carbon dioxide absorber. The solvent stream exits the recycle flash drum through line 122 and passes to carbon dioxide vent drum 124 from which more of the carbon dioxide is vented through line 126. The solvent stream then passes through line 128 to carbon dioxide vacuum drum 130 from which most of the remaining carbon dioxide is vented as shown in line 132. The resulting solvent is now semi-lean and passes through line 134 to semi-lean solvent pump 136, then to line 138, semi-lean solvent chiller 140 and then to line 142 to enter the carbon dioxide absorber.

Figure 3:
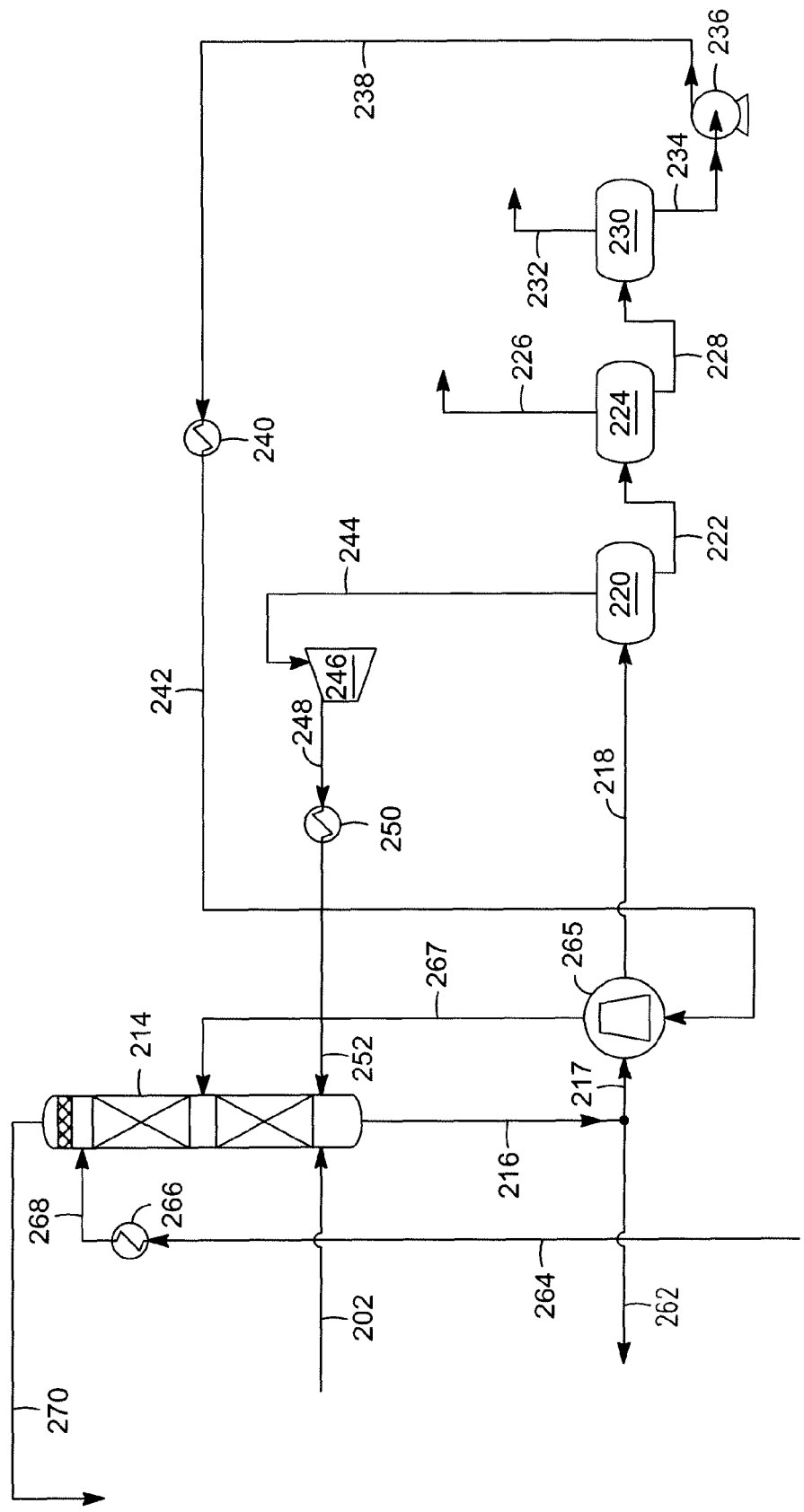
FIG. 3 shows a flow scheme in which a hydraulic turbocharger is used to recover energy from a semi-lean solvent stream to use in pumping a semi-lean solvent stream.

In FIG. 3, a gas treating process is shown that uses a hydraulic turbocharger to recover energy from a semi-lean solvent stream for use in pumping semi-lean solvent. A feed gas 202 enters a carbon dioxide absorber 214 where it is contacted with a semi-lean solvent that enters through line 267 and a lean solvent stream 264 that is chilled by chiller 266 and enters carbon dioxide absorber 214 through line 268. The gas stream is treated in the carbon dioxide absorber and the treated gas exits in line 270. The loaded solvent containing carbon dioxide exits the carbon dioxide absorber in line 216. A portion of this loaded solvent is sent through line 262 to another absorber or to be regenerated. The other portion of the loaded solvent passes in line 217 to hydraulic turbocharger 265. Also entering the hydraulic turbocharger is a semi-lean solvent stream in line 242. A solvent stream exits in line 267 to return to the carbon dioxide absorber and a carbon dioxide-containing solvent stream exits the hydraulic turbocharger in line 218 and then enters recycle flash drum 220 where some of the carbon dioxide passes through line 244 to recycle compressor 246 through line 248 to recycle cooler 250 to line 252 and then enters the carbon dioxide absorber. The solvent stream exits the recycle flash drum through line 222 and passes to carbon dioxide vent drum 224 from which more of the carbon dioxide is vented through line 226. The solvent stream then passes through line 228 to carbon dioxide vacuum drum 230 from which most of the remaining carbon dioxide is vented as shown in line 232. The resulting solvent is now semi-lean and passes through line 234 to semi-lean solvent pump 236, then to line 238, semi-lean solvent chiller 240 and then to line 242 to enter the hydraulic turbocharger.

Figure 4:
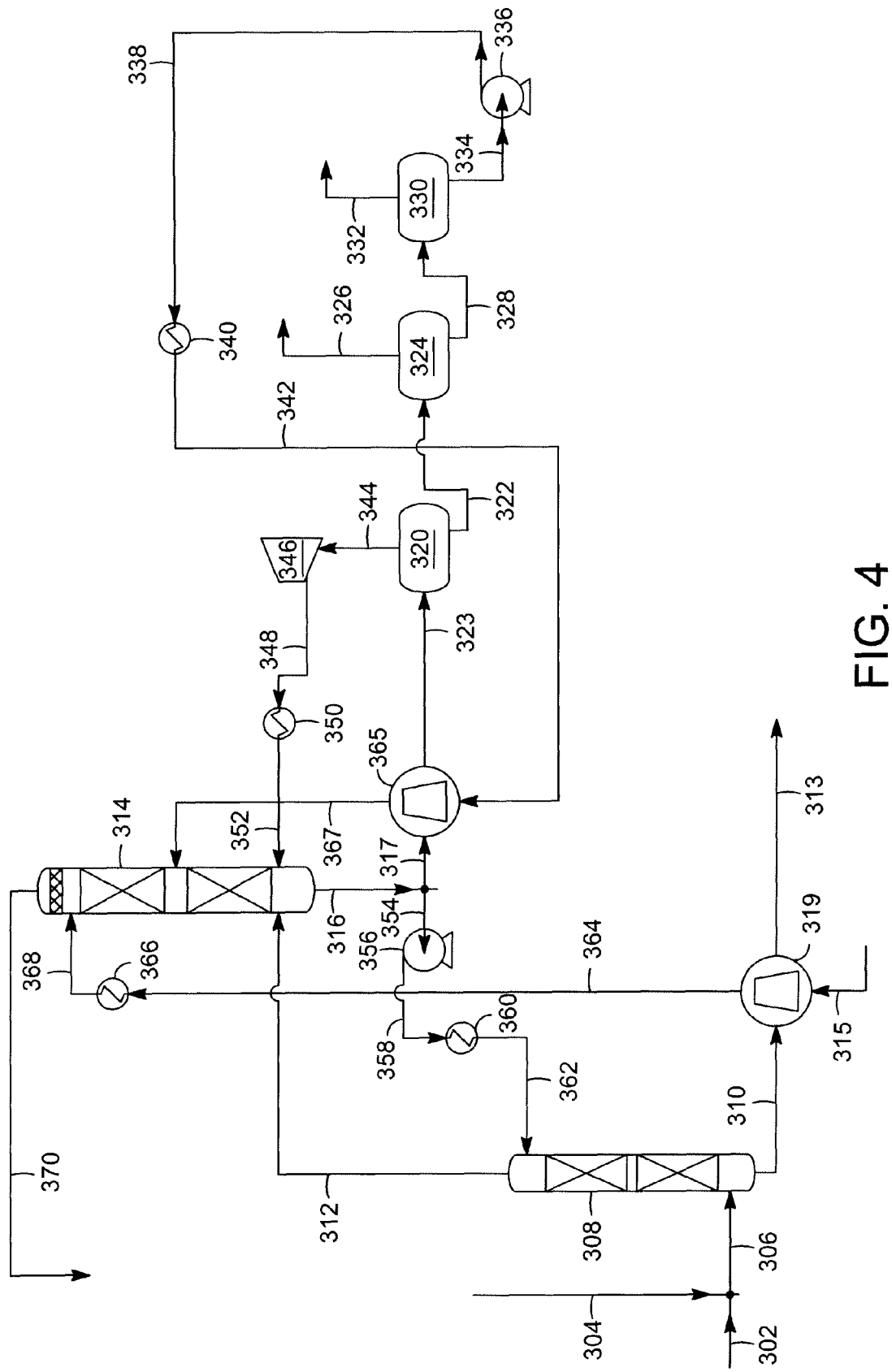
FIG. 4 shows a flow scheme in which a hydraulic turbocharger is used to recover energy from a semi-lean solvent stream to use in pumping a semi-lean solvent stream and to recover energy from the bottoms of a hydrogen sulfide absorber to use in pumping lean solvent.

In FIG. 4 is shown a gas treating process that uses a first hydraulic turbocharger to recover energy from a semi-lean solvent to use in pumping semi-lean solvent and a second hydraulic turbocharger to recover energy from a hydrogen sulfide absorber to use in pumping lean solvent. A feed gas 302 and a recycle gas 304 from a hydrogen sulfide concentrator are combined in line 306 to enter a hydrogen sulfide absorber 308. Also entering hydrogen sulfide absorber 308 is a loaded solvent 362. A rich solvent stream 310 leaves the bottom of the hydrogen sulfide absorber 308 and a gas stream containing carbon dioxide leaves the top of the hydrogen sulfide absorber in line 312. The gas stream in line 312 enters carbon dioxide absorber 314 where it is contacted with a semi-lean solvent that enters through line 367 and a lean solvent stream 364 that is chilled by chiller 366 and enters carbon dioxide absorber 14 through line 368. The gas stream is treated in the carbon dioxide absorber and the treated gas exits in line 370. The loaded solvent containing carbon dioxide exits the carbon dioxide absorber in line 316. A portion of this loaded solvent is sent through line 354 to loaded solvent pump 356 to line 358, loaded solvent chiller 360 and line 362 back to the previously described hydrogen sulfide absorber 308. The other portion of the loaded solvent passes in line 317 to a second hydraulic turbocharger 365. A solvent stream passes through line 323 to recycle flash drum 320 where some of the carbon dioxide passes through line 344 to recycle compressor 346 through line 348 to recycle cooler 350 to line 352 and then enters the carbon dioxide absorber. The solvent stream exits the recycle flash drum through line 322 and passes to carbon dioxide vent drum 324 from which more of the carbon dioxide is vented through line 326. The solvent stream then passes through line 328 to carbon dioxide vacuum drum 330 from which most of the remaining carbon dioxide is vented as shown in line 332. The resulting solvent is now semi-lean and passes through line 334 to semi-lean solvent pump 336, then to line 338, semi-lean solvent chiller 340 and then to line 342 to enter hydraulic turbocharger 365, where it is increased in pressures sufficient to enter carbon dioxide absorber 314 through line 367. In addition, the bottom stream 310 from hydrogen sulfide absorber 308 passes to a second hydraulic turbocharger 319. A lean solvent stream 315 also enters this second hydraulic turbocharger and shown exiting the second hydraulic turbocharger is a rich solvent stream 313 and a lean solvent stream 364.

Figure 5:
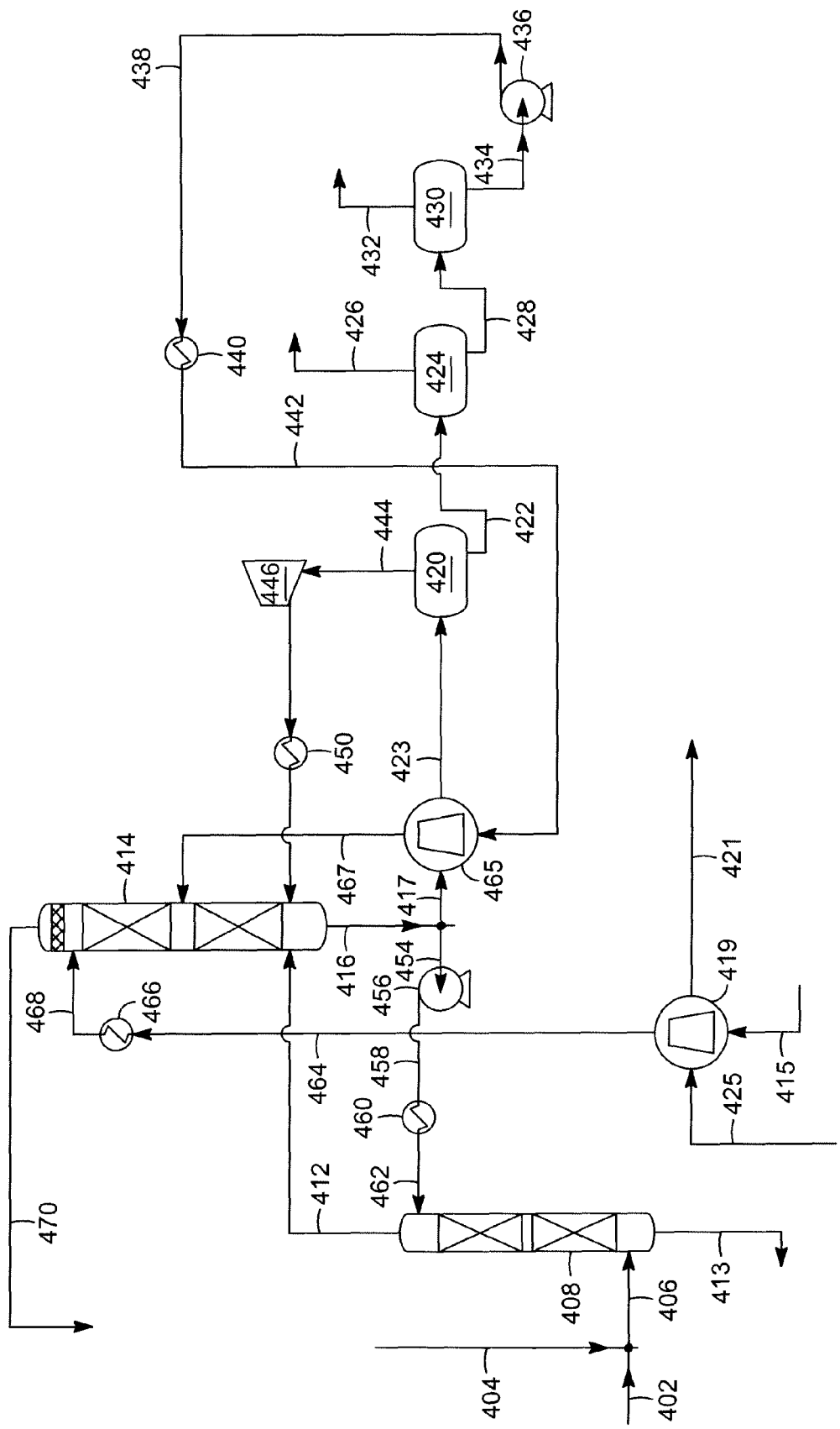
FIG. 5 shows a flow scheme in which a hydraulic turbocharger is used to recover energy from a carbon dioxide absorber bottoms to use in pumping a semi-lean solvent stream and to recover energy from the bottoms of a hydrogen sulfide absorber to use in pumping lean solvent.

In FIG. 5 is shown a gas treating process that uses a first hydraulic turbocharger to recover energy from a bottom stream leaving a carbon dioxide absorber to use in pumping semi-lean solvent and a second hydraulic turbocharger to recover energy from a hydrogen sulfide concentrator to use in pumping lean solvent. A feed gas 402 and a recycle gas 404 from a hydrogen sulfide concentrator are combined in line 406 to enter a hydrogen sulfide absorber 408. Also entering hydrogen sulfide absorber 408 is a loaded solvent 462. A rich solvent stream 413 leaves the bottom of the hydrogen sulfide absorber 408 and a gas stream containing carbon dioxide leaves the top of the hydrogen sulfide absorber in line 412. The gas stream in line 412 enters carbon dioxide absorber 414 where it is contacted with a semi-lean solvent that enters through line 467 and a lean solvent stream 464 that is chilled by chiller 466 and enters carbon dioxide absorber 414 through line 468. The gas stream is treated in the carbon dioxide absorber and the treated gas exits in line 470. The loaded solvent containing carbon dioxide exits the carbon dioxide absorber in line 416. A portion of this loaded solvent is sent through line 454 to loaded solvent pump 456 to line 458, loaded solvent chiller 460 and line 462 back to the previously described hydrogen sulfide absorber 408. The other portion of the loaded solvent passes in line 417 to a hydraulic turbocharger 465. A solvent stream passes through line 423 to recycle flash drum 420 where some of the carbon dioxide passes through line 444 to recycle compressor 446 through line 448 to recycle cooler 450 to line 452 and then enters the carbon dioxide absorber. The solvent stream exits the recycle flash drum 420 through line 422 and passes to carbon dioxide vent drum 424 from which more of the carbon dioxide is vented through line 426. The solvent stream then passes through line 428 to carbon dioxide vacuum drum 430 from which most of the remaining carbon dioxide is vented as shown in line 432. The resulting solvent is now semi-lean and passes through line 434 to semi-lean solvent pump 436, then to line 438, semi-lean solvent chiller 440 and then to line 442 to enter hydraulic turbocharger 465 where its pressure is increased sufficient to enter carbon dioxide absorber 414 through line 467. In addition, the bottoms stream 425 from hydrogen sulfide concentrator passes to a second hydraulic turbocharger 419. A lean solvent stream 415 also enters this second hydraulic turbocharger and shown exiting the second hydraulic turbocharger is a rich solvent stream 421 and a lean solvent stream 464.

Other embodiments may be employed that employ the basic principles of the present invention.

The invention claimed is:

1. A process for treating a carbon dioxide and/or hydrogen sulfide containing gas comprising:
   a) sending a feed gas containing carbon dioxide and hydrogen sulfide through a carbon dioxide absorber unit or a hydrogen sulfide absorber unit or through a carbon dioxide absorber unit and a hydrogen sulfide absorber unit, wherein said carbon dioxide absorber unit and said hydrogen sulfide absorber unit contain a lean solvent to produce a loaded solvent containing a majority of said carbon dioxide and/or hydrogen sulfide from said feed gas and a treated gas;
   b) regenerating said loaded solvent in a carbon dioxide and or hydrogen sulfide removal system;
   c) recovering energy from at least one solvent stream to boost pressure of at least one other solvent stream wherein at least one hydraulic turbocharger is used to recover said energy from a solvent stream that exits said carbon dioxide and/or hydrogen sulfide absorber unit and transfers said energy to pump a semi-lean solvent stream from said carbon dioxide removal system; and
   d) a second hydraulic turbocharger to recover energy from a hydrogen sulfide concentrator solvent stream to use in pumping a lean solvent stream.

2. A system for treating a carbon dioxide containing gas comprising a carbon dioxide absorber unit containing a lean solvent to produce a loaded solvent containing a majority of said carbon dioxide from carbon dioxide containing gas and a treated gas; a carbon dioxide removal system and at least one hydraulic turbocharger is used to recover energy from at least one solvent stream and to transfer said energy to a second solvent stream wherein a hydraulic turbocharger is used to recover energy from a semi-lean solvent stream that exits said carbon dioxide absorber unit and transfers said energy to pump a semi-lean solvent stream from said carbon dioxide removal system wherein a second hydraulic turbocharger to recover energy from a hydrogen sulfide concentrator solvent stream is used in pumping a lean solvent stream.

3. The system of claim 2 wherein said solvent is selected from the group consisting of dimethylether of polyethylene glycol, methanol, a mixture of N-formyl and N-acetyl morpholine, N-methyl-2-pyrrolidone and sulfolane.

* * * * *